Jan. 26, 1943.   C. A. COOK   2,309,441
POWER DIVIDER
Filed Aug. 14, 1941   2 Sheets-Sheet 1

INVENTOR.
Charles A. Cook
BY
ATTORNEYS.

Jan. 26, 1943. C. A. COOK 2,309,441
POWER DIVIDER
Filed Aug. 14, 1941 2 Sheets-Sheet 2

INVENTOR.
Charles A. Cook
BY
Earl & Chappell
ATTORNEYS.

Patented Jan. 26, 1943

2,309,441

UNITED STATES PATENT OFFICE 2,309,441

POWER DIVIDER

Charles A. Cook, Kalamazoo, Mich., assignor to Fuller Manufacturing Company, Kalamazoo, Mich.

Application August 14, 1941, Serial No. 406,791

5 Claims. (Cl. 74—310)

This invention relates to improvements in power dividers.

This invention relates to power dividers and particularly to power dividers for use in trucks or the like in which a plurality of axles are driven. In such trucks it is desirable to have the two driven axles driven from the same source of power and transmission but differentially connected so that differences in tire wear or inflation will be compensated for. When the truck is put in low gear, it is necessary in some instances, to have the differential locked so that full driving efficiency may be obtained.

The objects of this invention are:

First, to provide a new and improved power divider of the class described.

Second, to provide such a power divider which is simple in construction.

Third, to provide such a power divider which is compact and of small size.

Fourth, to provide such a power divider in which at high gear ratios differential drive is supplied for two axles, but in which at low gear ratios where the torque is greater, the drive is direct to one axle and through the differential to the other axle, making it possible to use a smaller differential than would be the case if the full torque had to be taken through the differential.

Other objects and advantages pertaining to details and economies of construction and operation will appear from the description to follow. The invention is defined in the claims. A preferred embodiment of my invention is illustrated in the accompanying drawings, in which:

Figure 1:
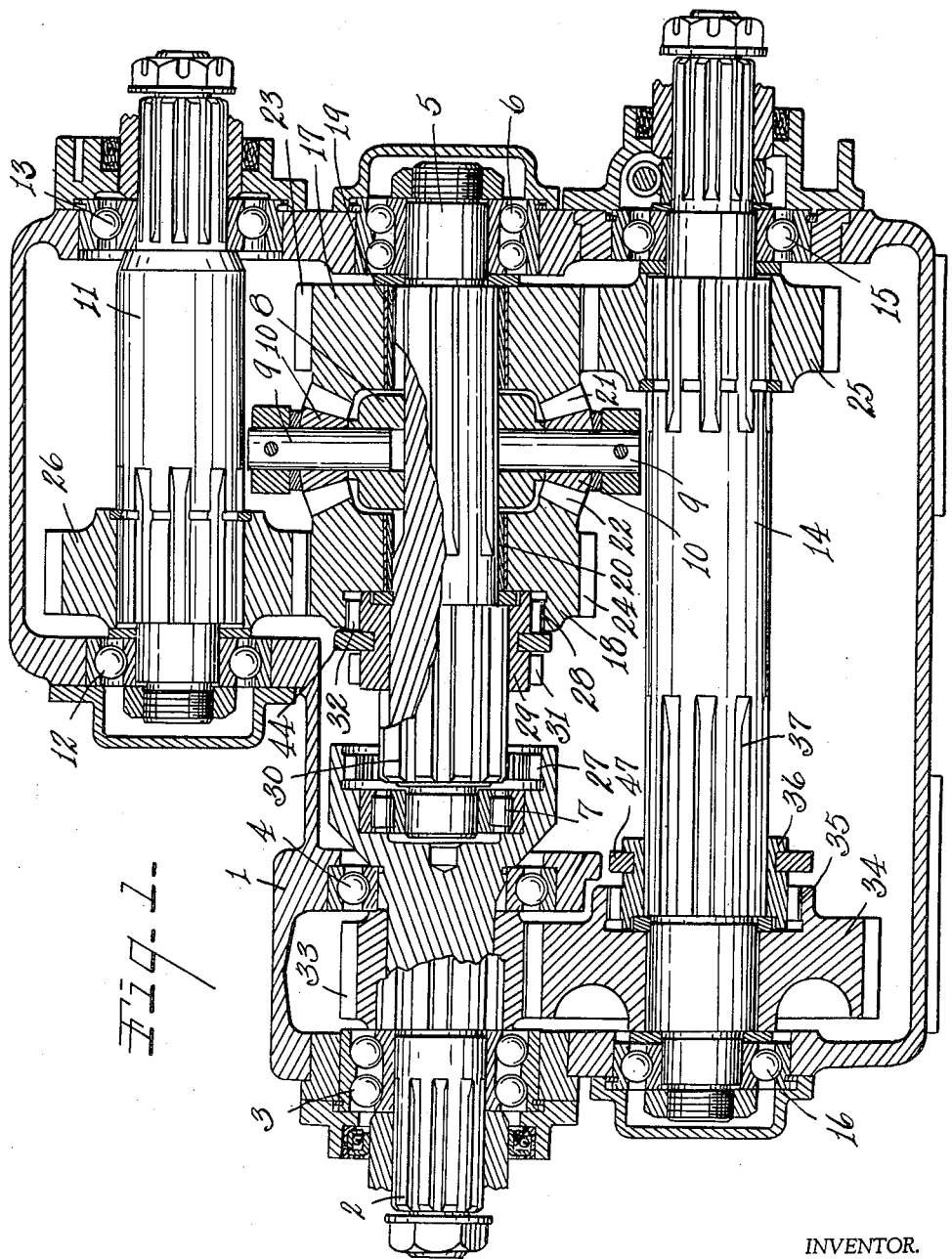
Fig. 1 is a detail sectional view through my improved power divider taken on the line 1—1 of Fig. 3.

My improved power divider consists of a suitable casing 1 provided with an input shaft 2 mounted in suitable bearings 3 and 4. The main shaft 5 mounted in bearings 6 in the case and bearings 7 in the end of the in-put shaft, has fixed or keyed thereto a differential spider 8 provided with the arms 9 carrying the differential pinions 10. An output shaft 11 mounted in bearings 12 and 13 is provided at one side of the main shaft. Another output shaft 14 mounted in bearings 15 and 16 is provided on the other side of the main shaft. Differential side gears 17 and 18 are mounted for free rotation on bearings 19 and 20 on the main shaft. The side gear 17 is provided with a set of teeth 21 to engage the pinions 10 and the side gear 18 is provided with a similar set of teeth 22. The side gear 17 is provided with a second set of teeth 23 and the side gear 18 has a similar set 24.

A gear 25 in mesh with the teeth 23 of the side gear 17 is keyed on the shaft 14. A similar gear 26 in mesh with the teeth 24 of the side gear 18 is provided on the shaft 11. On the end of the input shaft 2, I provide internal clutch teeth 27 and on the face of the side gear 18, I provide internal clutch teeth 28. A clutch member 29 is slidably mounted on the splines 30 on the main shaft 5. It has teeth 31 for engagement with the teeth 27 and teeth 32 for engagement with the teeth 28. This clutch member serves either to connect the main shaft 5 with the input shaft 2 or to lock the differential.

I provide a driving gear 33 on the main shaft and a driven gear 34 in mesh therewith journaled coaxially with the shaft 14. The gear 34 is provided with internal clutch teeth 35 and a clutch member 36 is slidably mounted on the splines 37 of the shaft 14. This clutch member serves to connect the gear 34 to the shaft 14 for driving the shaft or to disengage the gear 34 and the shaft 14.

In Fig. 1, I show the clutch member 36 engaging the clutch teeth 35 of the gear 34. The clutch member 29 is locking the differential. Power applied to the input shaft will drive the shaft 14 through the gears 33 and 34. The shaft 14 will drive the locked differential through gear 25 which is engaging the teeth 23 of the differential side gears 17. The locked differential will rotate and the teeth 24 of the differential side gear 18 will drive the gear 26 and the shaft 11. This is the position of the parts for low gear when non-differential operation is desired.

For differential driving of the shafts 11 and 14, the clutch member 36 is shifted to the right, disengaging the gear 34 from the shaft 14. The clutch member 29 is shifted to the left, the teeth 31 engaging the teeth 27 establishing a direct drive from the input shaft 2 to the main shaft. The differential is unlocked by this shifting of the clutch member 29 to the left as viewed in Fig. 1, establishing differential drive from the input shaft through the main shaft 5 and the differential with its side gears 17 and 18 through gears 25 and 26 to shafts 14 and 11 respectively. This is the position in which the power divider is used for higher gear ratios.

Figures 2, 3:
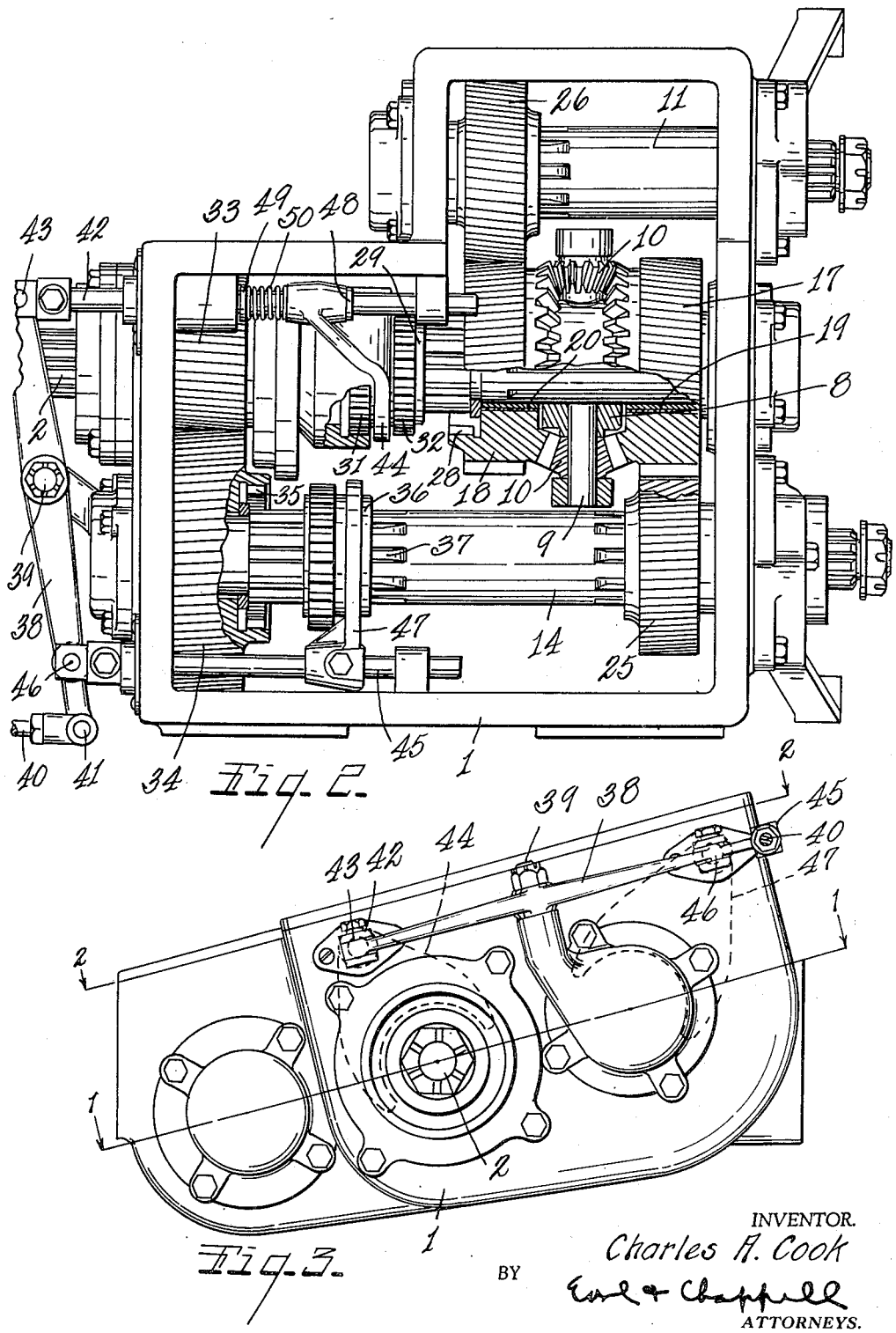
Fig. 2 is a detail sectional view of my power divider taken on the line 2—2 of Fig. 3.
Fig. 3 is an end elevational view of my power divider.

In order to selectively operate the clutch members 29 and 36, I provide a lever 38 pivoted at 39 and connected to a cab control by a pitman 40 which is pivoted at 41 to the end of the lever. A shifter rod 42 is pivoted to the lever 38 at 43. It carries a shifting fork 44 engaging the clutch member 29. A shifter rod 45 pivoted to the lever 38 at 46 carries a shifting fork 47 engaging the clutch member 36. In the position shown in Fig. 2, the clutch member 36 is disengaged and the clutch member 29 is moved so that its teeth 31 are in engagement with the teeth 37, establishing the differential drive to the shaft.

When the lever 38 is pivoted in a clockwise direction about its pivot 39, the shifting from the differential to the locked position takes place.

In order to simplify the shifting, the shifting fork 44 is slidably mounted on the shifter rod 42. A collar 48 engages the fork 44 to move it to the left. Movement to the right is obtained by means of a collar 49 with the interposed compression spring 50. When the lever 38 is pivoted in a clockwise direction, moving the clutch member 29 toward the differential side gear 18, the teeth 32 may not be in line with the teeth 28 and in such a case the spring 50 will compress, serving to hold the member under pressure against the face of the differential side gear 18 until some differential action takes place, whereupon the spring 50 will urge the clutch member 29 to the right and the teeth 28 and 32 will engage, locking the differential.

The improved power divider may be made very inexpensively. The drive when the differential is locked is such that the torque need not be taken through the differential for both output shafts. This makes it possible to use a much smaller differential. The number of parts is minimum and the case can be made much shorter than the cases in the present power dividers which results in considerable saving and in a great advantage in installation.

The terms and expressions which have been herein employed are used as terms of description and not of limitation, and there is no intention in the use of such terms and expressions of excluding any equivalents of the features shown and described. It is recognized that various modifications are possible within the scope of the invention claimed.

Having thus described my invention, what I claim as new and desire to secure by Letters Patent is:

1. In a power divider, the combination of an input shaft, a main shaft coaxial therewith, a differential spider fixed to said main shaft and having differential pinions thereon, a pair of cooperating differential side gears each having a set of teeth in mesh with said pinions, one being journaled for free rotation on said main shaft each side of said spider, each of said side gears having a second set of gear teeth, a pair of output shafts, each having a gear fixed thereon, one in mesh with the second set of teeth of one side gear and the other with the second set of teeth of the other side gear, clutch means on said input shaft, clutch means on one of said side gears, a main shaft clutch member splined on said main shaft and shiftable thereon to selectively engage said clutch means on said input shaft and on said side gear, a driving gear on said input shaft, a driven gear in mesh therewith for free rotation on an axis coaxial with the axis of one output shaft, clutch means on said driven gear, a clutch member splined on said output shaft and shiftable to engage or disengage said clutch means on said driven gear, and means for simultaneously shifting said clutch members to selectively simultaneously engage said main shaft clutch member with said side gear clutch means and said second clutch member with said driven gear clutch means or to engage said main shaft clutch member with said input shaft clutch means and to disengage said second mentioned clutch member from said driven gear clutch means.

2. In a power divider, the combination of an input shaft, a main shaft coaxial therewith, a differential spider fixed to said main shaft and having differential pinions thereon, a pair of cooperating differential side gears each having a set of teeth in mesh with said pinions, one being journaled for free rotation on said main shaft each side of said spider, each of said side gears having a second set of gear teeth, a pair of output shafts, each having a gear fixed thereon, one in mesh with the second set of teeth of one side gear and the other with the second set of teeth of the other side gear, clutch means on said input shaft, clutch means on one of said side gears, a main shaft clutch member splined on said main shaft and shiftable thereon to selectively engage said clutch means on said input shaft and on said side gear, a driving gear on said input shaft, a driven gear in mesh therewith for free rotation on an axis coaxial with the axis of one output shaft, clutch means on said driven gear, and a clutch member splined on said output shaft and shiftable to engage or disengage said clutch means on said driven gear.

3. In power divider, the combination of an input shaft, a main shaft, a differential spider fixed to said main shaft and having differential pinions, a pair of cooperating differential side gears each having a set of teeth in engagement with said pinions, one journaled for free rotation on each side of said spider, each of said side gears having a second set of gear teeth, a pair of output shafts each having a gear fixed thereon, one in mesh with the second set of teeth of one side gear and the other with the second set of teeth of the other side gear, means for operatively connecting said input shaft with said main shaft, means for operatively connecting one of said output shafts to said input shaft, and means for selectively operating said last two named means whereby either said main shaft or said output shaft is operatively connected to said input shaft while the other is disconnected therefrom, locking means for locking one of said differential side gears to said main shaft, and means for actuating said locking means when said input shaft and main shaft are disconnected and when said input shaft is operatively connected to said output shaft.

4. In a power divider, the combination of an input shaft, a main shaft, a differential spider fixed to said main shaft and having differential pinions, a pair of cooperating differential side gears each having a set of teeth in engagement with said pinions, one journaled for free rotation on each side of said spider, each of said side gears having a second set of gear teeth, a pair of output shafts each having a gear fixed thereon, one in mesh with the second set of teeth of one side gear and the other with the second set of teeth of the other side gear, means for operatively connecting said input shaft with said main shaft, means for operatively connecting one of said output shafts to said input shaft, and locking means for locking one of said differential side gears to said main shaft.

5. In a power divider, the combination of an in-put shaft and a pair of out-put shafts, a differential between said out-put shafts, means for selectively connecting said in-put shaft to said differential for differentially driving said out-put shafts or for disconnecting said in-put shaft and said differential, means for selectively connecting one out-put shaft to said input shaft for disconnecting said output shaft and said in-put shaft, and means for establishing driving connection between said out-put shafts through said differential comprising means for locking said differential whereby said out-put shafts may be driven differentially with said in-put shaft connected to said differential and said in-put shaft disconnected from the out-put shafts and the differential unlocked or whereby one out-put shaft may be driven by said in-put shaft and the other driven non-differentially therefrom through said differential when said in-put shaft is disconnected from said differential and a connection is established between the in-put shaft and an out-put shaft and said differential is locked.

CHARLES A. COOK.